United States Patent [19]

Riesinger

[11] Patent Number: 4,913,950

[45] Date of Patent: Apr. 3, 1990

[54] REPAIR PATCH FOR RUBBER AND PLASTIC ARTICLES

[75] Inventor: Adolf Riesinger, Poinger Strasse, Fed. Rep. of Germany

[73] Assignee: Stahlgruber Otto Gruber GmbH & Co., Fed. Rep. of Germany

[21] Appl. No.: 230,583

[22] Filed: Aug. 10, 1988

[30] Foreign Application Priority Data

Aug. 13, 1987 [DE] Fed. Rep. of Germany ....... 3726991

[51] Int. Cl.$^4$ ............................................. B32B 3/02
[52] U.S. Cl. ......................................... 428/64; 428/68; 428/80; 428/124; 428/127; 428/192; 428/195; 428/272; 428/493; 428/66
[58] Field of Search ................... 428/64, 80, 124, 127, 428/192, 195, 212, 493, 68, 66; 156/97

[56] References Cited

U.S. PATENT DOCUMENTS

| | | |
|---|---|---|
| 4,234,369 | 11/1980 | Schelkmann ........................ 156/97 |
| 4,285,382 | 8/1911 | DiRocco et al. ..................... 156/97 |
| 4,333,508 | 6/1982 | DiRocca et al. ..................... 156/97 |
| 4,399,854 | 8/1983 | DiRocco et al. ................... 156/322 |
| 4,424,088 | 1/1984 | Durif ................................... 156/286 |
| 4,578,421 | 3/1986 | Tournier ............................. 524/511 |
| 4,634,488 | 1/1987 | Tournier ............................. 156/305 |
| 4,756,337 | 7/1988 | Settineri ............................... 156/49 |

*Primary Examiner*—Ellis P. Robinson
*Assistant Examiner*—P. J. Ryan
*Attorney, Agent, or Firm*—Connolly & Hutz

[57] ABSTRACT

Patches are provided for repairing damaged articles made of rubber or plastic. Each patch has a main element and a connecting layer applied to the underside of the main element and also extending over part of the top of the main element. For repairs, several patches can be placed over each other and next to each other partly overlapping without the necessity of prior cleaning and roughening of the sites where the connecting layers overlap.

9 Claims, 1 Drawing Sheet

REPAIR PATCH FOR RUBBER AND PLASTIC ARTICLES

BACKGROUND OF THE INVENTION

For the repair of rubber articles of any type with or without textile or textile-like reinforcement, for example, tire tubes, conveyor belts, inflatable boats, rubber garments, pool animals or rubberized textiles, for example, tent tarpaulins and ground sheets, vehicle tarpaulins and other tarpaulins and the like as well as of plastic articles, so-called "patches" are used which cover the hole- or tear-shaped damage site with a main element which is connected with the area around the site by means of a thin connecting layer which has been applied to the bottom of the main element. When rubber articles have to be repaired, the main element consists of vulcanized rubber and the connecting layer of unvulcanized, vulcanizable rubber which after expert repairs becomes vulcanized. The patches, at least on the bottom, are provided with a cover consisting, for example, of parchment paper or aluminum foil for the protection of the connecting layer, which must be pulled off before the patch is used.

The method of repair is generally known and therefore need only be briefly explained. The damage site must first be cleaned followed by a mechanical or chemical roughening. The area around the damage site is then brushed with an adhesive liquid or paste or vulcanization solution and the patch is then firmly pressed on the damage site, for example, by rolling.

Since the patch according to the invention was developed for the repair of rubber articles, it is described in the following in this respect although it is also suitable for the repair of plastic articles. For these patches, the unvulcanized, vulcanizable connecting layer is supplied with the accelerator required for through vulcanization via the vulcanizing solution brushed on the area around the damage site before the patch is applied while it withdraws the also required sulfur fraction from the article, roughened at the damage site, to be repaired.

Normal type and size damage sites, preferably, utilize commercially available circular, sometimes also rectangular, patches whereby the diameter depends on the size of the damage site. Depending on their diameter, these patches can be used to span larger holes and also smaller tears. Relatively long, often incorrectly called oval, patches with circular ends are used for longer tears but, in part, also strips and tapes are available. It is disadvantageous, however, that different patches having different sizes must be kept on hand for any eventuality in addition to the round patches for the small tears. Sometimes tears have considerable length.

DE-AS 10 08 800 discloses that the sharp edge of the main element gradually ending in one side can be embedded in the projecting edge of the connecting layer in such a way that all around along the entire projecting connecting layer edge, a narrow part of this connecting layer edge overlaps the main element and consequently covers a small part of the surface of the edge of the main element.

SUMMARY OF THE INVENTION

The present invention is based on the objective of providing a repair patch of a very different nature and size from patches having a basic shape. The patch may be used alone or in combination with other patches of similar shape, particularly to cover elongate damage sites.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein similar reference characters refers to similar parts and in which.

DETAILED DESCRIPTION OF THE INVENTION

Figure 2:
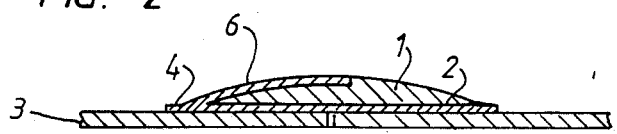
FIG. 2 is a sectional view taken along line 2—2 of FIG. 1.

At the outset it should be noted that the sectional view of FIG. 2 of the drawing shows the size relationships somewhat out of proportion for drafting purposes and to better illustrate the invention. In actuality a repair patch of this diameter is not as thick as it is shown. The main element of the repair patch is much flatter and its connecting layer is much thinner.

The primary components of the repair patch of the present invention include a main element 1 of vulcanized rubber which spans the damage site s and gives it strength, and a thin connecting layer 2 on the flat underside of the main element which faces the article 3 to be repaired. The connecting layer consists of unvulcanized rubber which can be vulcanized with an accelerator added via a vulcanization solution and with sulfur dissolved out from the repaired article. In likewise known manner, the connecting layer projects beyond the main element 1 on all sides and in this way forms a projecting edge 4 which elastically absorbs any flexing transferred from a driven tire to the tube. Such flexing produces extension buckling and the projecting edge prevents edge tearing as well as separation of the connecting layer from the main element or the repaired article. Added support is provided by the edge of the main element which ends in projections or teeth 5 extending well into the connecting layer edge.

According to the invention, the thin connecting layer 2 at the underside of the patch, starting from the edge, continues as an upper connecting layer 6 over a part of the top of the main element 1, as shown in FIG. 2. The upper connecting layer may be stepped for this purpose so that several patches generally designated 8', 8", 8Δ partially overlap one another, according to FIG. 3. Patches 8', 8", 8Δ may be placed over and next to each other to cover and repair a longer tear-shaped damage site 7. Since patches having a diameter such as shown in FIG. 2 are much thinner than illustrated, the partial overlapping results in a barely noticeable thick spot at the damage site which does impede the usefulness of the repaired article, with this type of repair, cleaning and roughening of the overlap sites can be omitted since the connecting layers previously protected by cover films fit against each other.

Figure 1:
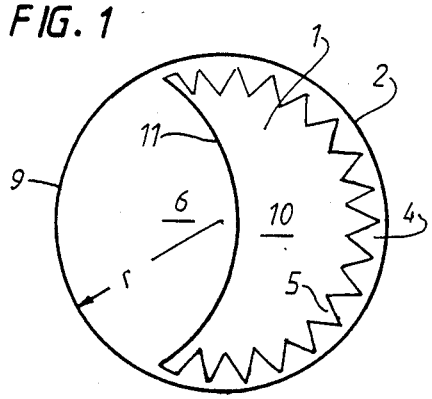
FIG. 1 is a top plan view of a repair patch, according to the present invention.
Figure 3:
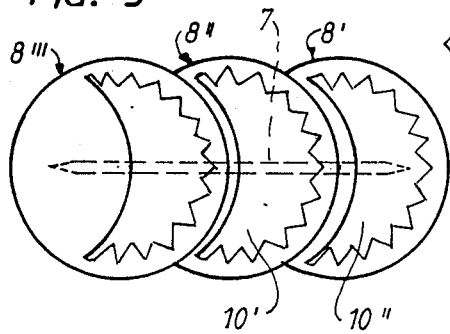
FIG. 3 is a top plan view of a plurality of repair patches of the type illustrated in FIG. 1 arranged to span an elongate damage site, according to the present invention.

In the example, the repair patches according to FIGS. 1 to 3 are circular in shape and the connecting layer 6 overlapping the top of the main element 1 is recessed by its thickness into main element 1. The upper connecting layer 6 is curved opposite edge 9 in such a way that in plan view a cresent-shaped section 10 of the main element remains. The curvature of the inner boundary line 11 of the connecting layer corresponds or approximately corresponds to the radius r of the patch so that, as shown in FIG. 3, main element sections 10', 10", 10Δ can be placed very close to one another.

Figure 4:
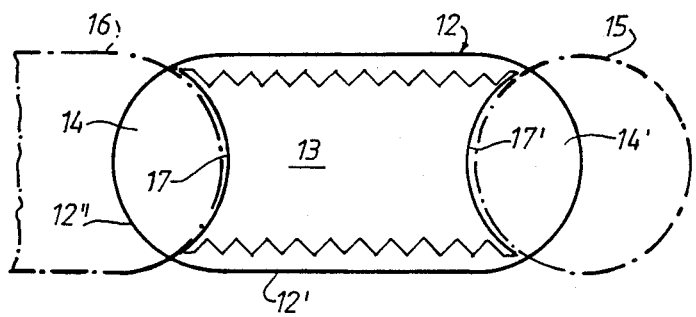
FIG. 4 is a top plan view of another repair patch, according to the present invention.

Although the invention was conceived to accommodate the many shapes of patches, in other words, eliminate long patches and meet the objective of long patches with a plurality of round patches, the fundamental concept of the invention can also be realized with a relatively long patch 12, such as shown in FIG. 4. Patch 12 has a main element 13 and at least one connecting layer extending in part also on the top of the patch. In the example, two connecting layer parts 14, 14' are provided, each drawn on the top of the patch. The upper layer parts are applied at both ends in the same shape as shown in FIGS. 1 to 3 so that longer damage sites than possible with a patch of this size can be spanned. Also, as shown in interrupted lines, round patches 15 or other relatively long patches 16 may be applied in overlapping relationship for an increase in length.

Figure 5:
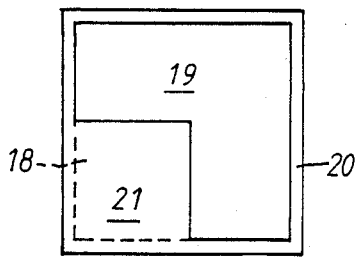
FIG. 5 is a top plan view of still another repair patch, according to the present invention.
Figure 6:
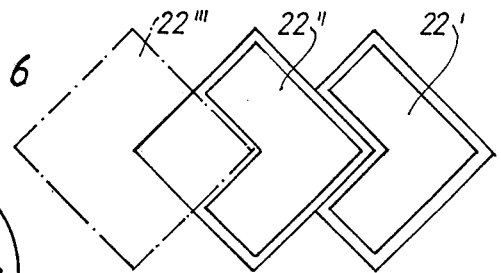
FIG. 6 is a top plan view of a plurality of repair batches of the type illustrated in FIG. 5 arranged to span an elongate damage site, according to the present invention.

The invention may also be realized in other shapes of patches, for example, with four corners or square. FIG. 5, in plan view, shows a square patch having a main element 18 of which the part 19 visible on the top side is L-shaped and of which the connecting layer applied to the bottom and forming a projecting edge 20 continues on the top in a rectangular part 21. Several patches 22', 22" and 22Δ can be placed as shown in FIG. 6 in the same manner as described above, namely overlapping and next to each other to span a longer tear-shaped damage site.

Figure 7:
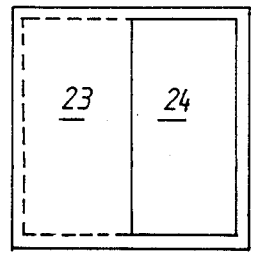
FIG. 7 is a top plan view of another repair patch, according to the present invention.

According to FIG. 7, the connecting layer 23 overlapping the top of the patch may also have a rectangular shape the size of or approximately the size of the visible part 24 of the main element.

When the damage site has the shape of a hole with a tear proceeding from the hole to one side, for example, different size patches can be readily combined. In this case as a start of a chain of patches, a large diameter patch with patches having smaller or decreasing diameters on both sides may be used.

What is claimed is:

1. A repair patch for rubber and plastic articles comprising a main element of vulcanized rubber for spanning a damage site in the article and a connecting layer of unvulcanized rubber extending along the underside of the main element and forming a projecting edge outwardly extending beyond the main element, the connecting layer also partially covering the top area of the main element whereby the underside of a patch of similar configuration may be secured to the partial connecting layer area on the top of the patch to repair elongate damage sites in the article.

2. A repair patch as in claim 1 wherein the uncovered area of the main element on top of the patch has a cresent shape.

3. A repair patch as in claim 2 wherein the top part of the connecting layer covers less than half of the surface of the main element.

4. A repair patch as in claim 3 wherein the projecting edge is circular and the top part of the connecting layer has an inner curved boundary line with a radius that corresponds or approximately corresponds to the radius of the projecting edge.

5. A repair patch as in claim 1 having an elongate shape with opposite side edges and opposite semi-circular end edges, and wherein the connecting layer at least covers the main element at one end of the patch.

6. A repair patch as in claim 5 wherein the connecting layer partially covers the main element at each end of the path.

7. A repair path as in claim 5 wherein the top part of the connecting layer has an inwardly curved boundary line opposite to the semi-circular end edges.

8. A repair patch as in claim 1 wherein the patch is generally square and the top portion of the main element uncovered by the connecting layer is L-shaped.

9. A repair patch as in claim 1 wherein the patch is generally rectangular, and both the top part of the connecting layer and the top portion of the main element uncovered by the connecting layer are rectangular.

* * * * *